US009393522B2

(12) United States Patent
Asanuma et al.

(10) Patent No.: US 9,393,522 B2
(45) Date of Patent: Jul. 19, 2016

(54) METHOD FOR COMBUSTING DIESEL EXHAUST GAS

(71) Applicant: MITSUI MINING & SMELTING CO., LTD., Tokyo (JP)

(72) Inventors: Takahito Asanuma, Saitama (JP); Hiromitsu Takagi, Saitama (JP); Isamu Yashima, Saitama (JP); Akira Abe, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 365 days.

(21) Appl. No.: 14/016,795

(22) Filed: Sep. 3, 2013

(65) Prior Publication Data

US 2014/0004026 A1    Jan. 2, 2014

Related U.S. Application Data

(62) Division of application No. 12/994,504, filed as application No. PCT/JP2008/069243 on Oct. 23, 2008, now abandoned.

(30) Foreign Application Priority Data

May 29, 2008  (JP) ................. 2008-141541

(51) Int. Cl.
*B01D 53/56* (2006.01)
*B01D 53/94* (2006.01)
*B01D 39/20* (2006.01)
*B01D 53/96* (2006.01)
*B01J 21/06* (2006.01)
*B01J 23/50* (2006.01)
*B01J 35/10* (2006.01)
*B01J 37/08* (2006.01)
*F01N 3/035* (2006.01)

(52) U.S. Cl.
CPC ............ *B01D 53/94* (2013.01); *B01D 39/2068* (2013.01); *B01D 53/944* (2013.01); *B01D 53/96* (2013.01); *B01J 21/066* (2013.01); *B01J 23/50* (2013.01); *B01J 35/1009* (2013.01); *B01J 35/1014* (2013.01); *B01J 37/08* (2013.01); *F01N 3/035* (2013.01); *B01D 2255/104* (2013.01); *B01D 2255/20715* (2013.01); *B01D 2255/9207* (2013.01); *B01D 2258/012* (2013.01); *F01N 2370/00* (2013.01)

(58) Field of Classification Search
CPC ............... B01D 39/2068; B01D 53/96; B01D 2255/104; B01J 23/50; F01N 2370/00; F01N 3/035

USPC ....................................... 423/213.2
See application file for complete search history.

(56) References Cited

U.S. PATENT DOCUMENTS

| 4,927,799 A | 5/1990 | Matsumoto et al. |
| 5,540,981 A | 7/1996 | Gallagher et al. |
| 5,935,529 A | 8/1999 | Saito |
| 6,034,029 A | 3/2000 | Wulff-Döring et al. |
| 2005/0135980 A1 | 6/2005 | Park et al. |
| 2010/0111789 A1 | 5/2010 | Fajardie et al. |

FOREIGN PATENT DOCUMENTS

| EP | 1637225 | 3/2006 |
| FR | 2905371 | 3/2008 |
| JP | 9-075739 | 3/1997 |
| JP | 9-085053 | 3/1997 |
| JP | 9-088727 | 3/1997 |
| JP | 10-047035 | 2/1998 |
| JP | 11-005035 | 1/1999 |
| JP | 3012249 | 12/1999 |
| JP | 2003-334443 | 11/2003 |
| JP | 2004-058013 | 2/2004 |
| WO | WO 2007/043442 | 4/2007 |

OTHER PUBLICATIONS

International Search Report, PCT/JP2008/069243, Dec. 22, 2008.
Lj. Kundakovic et al., "Deep Oxidation of Methane Over Zirconia Supported Ag Catalysts", Applied Catalysis A: General, vol. 183, Dec. 31, 1999, pp. 35-51, XP002660522.
M. Kilo et al., "Surface Oxidic Phases of Binary and Ternary Zirconia-Supported Metal Catalysts Investigated by Raman Spectroscopy", J. Chem. Soc. Faraday Trans., vol. 88, Dec. 31, 1992, pp. 1453-1457, XP009152771.
N. Aoyama et al., "Characterization of Highly Active Silver Catalyst for NOx Reduction in Lean-Burning Engine Exhaust", Catalysis Letters, vol. 43, Dec. 31, 1997, pp. 249-253, XP002660603.
Extended European Search Report dated Nov. 15, 2011 issued in counterpart European Application No. 08874480.0.

*Primary Examiner* — Tom P Duong
(74) *Attorney, Agent, or Firm* — Young & Thompson

(57) ABSTRACT

Provided is a particulate combustion catalyst including a carrier formed of monoclinic zirconium oxide particles, and metallic Ag or Ag oxide, which serves as a catalyst component and is supported on the carrier, wherein the amount of the catalyst component is 0.5 to 10 mass %, as reduced to metallic Ag, on the basis of the mass of the carrier, and preferably, the catalyst has a BET specific surface area of 8 to 21 $m^2/g$. Also provided are a particulate filter coated with the particulate combustion catalyst; and an exhaust gas cleaning apparatus including a particulate filter coated with the particulate combustion catalyst.

11 Claims, No Drawings

METHOD FOR COMBUSTING DIESEL EXHAUST GAS

CROSS REFERENCE TO RELATED APPLICATIONS

This application is a division of application Ser. No. 12/994,504 filed on Nov. 24, 2010, which is a National Stage of PCT/JP2008/069243 filed on Oct. 23, 2008, which claims foreign priority to Japanese application No. 2008-141541 filed On May 29, 2008. The entire contents of each of the above applications are hereby incorporated by reference.

TECHNICAL FIELD

The present invention relates to a particulate combustion catalyst, to a particulate filter, and to an exhaust gas cleaning apparatus. More particularly, the present invention relates to a particulate combustion catalyst which realizes, at low temperature, removal (through oxidation) of particulate matter discharged from a diesel internal combustion engine; to a particulate filter coated with the particulate combustion catalyst; and to an exhaust gas cleaning apparatus including the particulate filter coated with the particulate combustion catalyst.

BACKGROUND ART

Exhaust gas discharged from diesel engines contains particulates (i.e., particulate matter), and release of such a substance into the atmosphere without any treatment is a main cause of air pollution. Therefore, demand has arisen for strict regulation for such a substance. There has been proposed, as effective means for removing particulate matter, a flow-through oxidation catalyst for combustion of soluble organic fractions (SOFs), or a diesel exhaust gas trapping system employing a diesel particulate filter (DPF) for trapping soot. However, for regeneration of such a DPF, particulate matter trapped therein must be continuously removed through oxidation.

Hitherto proposed continuous regeneration systems include a system employing a catalyst including a carrier made of, for example, an oxide of a metal (e.g., aluminum, zirconium, cerium, titanium, or vanadium) or a composite oxide, and an expensive noble metal (e.g., Pt) supported on the carrier (see, for example, Patent Document 1, 2, or 3); and a continuous regeneration method involving $NO_2$ (see, for example, Patent Document 4). This continuous regeneration method requires provision, upstream of a DPF, of an oxidation catalyst (e.g., Pt) for oxidizing NO into $NO_2$, and thus involves high cost. In addition, reaction involving $NO_2$ is affected by the ratio of $NO_x$ to C, and many restrictions are imposed on the employment of this method.

Patent Document 1: Japanese Patent Application Laid-Open (kokai) No. H10-047035
Patent Document 2: Japanese Patent Application Laid-Open (kokai) No. 2003-334443
Patent Document 3: Japanese Patent Application Laid-Open (kokai) No. 2004-058013
Patent Document 4: Japanese Patent No. 3012249

DISCLOSURE OF THE INVENTION

Problems to be Solved by the Invention

An object of the present invention is to provide a particulate combustion catalyst which realizes removal of soot through oxidation at low temperature without employment of an expensive noble metal, and which enables oxidation reaction to proceed with the aid of only oxygen and thus realizes removal of soot through oxidation at low temperature regardless of the $NO_x$ concentration of exhaust gas. Another object of the present invention is to provide a particulate filter coated with the particulate combustion catalyst. Yet another object of the present invention is to provide an exhaust gas cleaning apparatus comprising the particulate filter coated with the particulate combustion catalyst.

Means for Solving the Problems

In order to achieve the aforementioned objects, the present inventors have conducted extensive studies, and as a result have found that the objects can be achieved by providing a particulate combustion catalyst including specific zirconium oxide particles serving as a carrier, and metallic Ag or Ag oxide serving as a catalyst component, the catalyst component being supported on the carrier, wherein the amount of the catalyst component falls within a specific range, and preferably, the catalyst has a BET specific surface area falling within a specific range. The present invention has been accomplished on the basis of this finding.

Accordingly, the present invention provides a particulate combustion catalyst characterized by comprising a carrier formed of monoclinic zirconium oxide particles, and metallic Ag or Ag oxide, which serves as a catalyst component and is supported on the carrier, wherein the amount of the catalyst component is 0.5 to 10 mass %, as reduced to metallic Ag, on the basis of the mass of the carrier.

Preferably, the particulate combustion catalyst of the present invention comprises a carrier formed of monoclinic zirconium oxide particles, and metallic Ag or Ag oxide, which serves as a catalyst component and is supported on the carrier, wherein the amount of the catalyst component is 0.5 to 10 mass %, as reduced to metallic Ag, on the basis of the mass of the carrier, and the catalyst has a BET specific surface area of 8 to 21 $m^2/g$.

More preferably, the particulate combustion catalyst of the present invention comprises a carrier formed of monoclinic zirconium oxide particles, and metallic Ag or Ag oxide, which serves as a catalyst component and is supported on the carrier, wherein the amount of the catalyst component is 1 to 9 mass %, as reduced to metallic Ag, on the basis of the mass of the carrier, and the catalyst has a BET specific surface area of 11 to 20 $m^2/g$.

The present invention also provides a particulate filter characterized by being coated with any of the aforementioned particulate combustion catalysts. The present invention also provides an exhaust gas cleaning apparatus characterized by comprising a particulate filter coated with any of the aforementioned particulate combustion catalysts.

Effects of the Invention

Employment of the particulate combustion catalyst of the present invention realizes removal of soot through oxidation at low temperature without use of an expensive noble metal. When the particulate combustion catalyst is employed, since oxidation reaction proceeds with the aid of only oxygen, soot can be removed through oxidation at low temperature regardless of the $NO_x$ concentration of exhaust gas.

BEST MODES FOR CARRYING OUT THE INVENTION

The particulate combustion catalyst of the present invention includes a carrier formed of monoclinic zirconium oxide particles, and metallic Ag or Ag oxide, which serves as a catalyst component and is supported on the carrier. Although various types of zirconium oxide (e.g., monoclinic zirconium oxide and stabilized cubic zirconium oxide) are commercially available, the particulate combustion catalyst of the present invention employs monoclinic zirconium oxide as a carrier.

In the particulate combustion catalyst of the present invention, metallic Ag or Ag oxide must be supported, as a catalyst component, on the aforementioned carrier. Metallic Ag or Ag oxide, which is employed in the present invention, is less expensive than, for example, Pt or Pd. In addition, when metallic Ag or Ag oxide is employed in combination with a specific carrier used in the present invention, further excellent effects are obtained, as compared with the case where a Pt or Pd component is employed. In the present invention, the amount of metallic Ag or Ag oxide supported on the carrier is 0.5 to 10 mass % (preferably, 1 to 9 mass %), as reduced to metallic Ag, on the basis of the mass of the carrier. When the amount of the catalyst component supported is less than 0.5 mass %, the catalyst component may fail to sufficiently exhibit its catalytic effects, and Tig (combustion initiation temperature) becomes higher than 300° C. Even when the amount of the catalyst component supported exceeds 10 mass %, effects commensurate with such a large catalyst component amount cannot be attained. In addition, when the amount of the catalyst component is large, sintering of metal is likely to occur, and the catalyst component is not expected to exhibit its catalytic effects. When the amount of the catalyst component supported is 1 to 9 mass %, as reduced to metallic Ag, on the basis of the mass of the carrier, and the catalyst has a BET specific surface area of 11 to 20 $m^2/g$, Tig becomes 260° C. or lower, although the reason for this has not been elucidated.

The particulate combustion catalyst of the present invention preferably has a BET specific surface area of 8 to 21 $m^2/g$, more preferably 11 to 20 $m^2/g$. When the catalyst has a BET specific surface area of less than 8 $m^2/g$, Tig tends to become higher than 300° C., whereas when the catalyst has a BET specific surface area in excess of 21 $m^2/g$, Tig also tends to become higher than 300° C. As described above, when the catalyst has a BET specific surface area of 11 to 20 $m^2/g$, and the amount of the catalyst component supported is 1 to 9 mass %, as reduced to metallic Ag, on the basis of the mass of the carrier, Tig becomes 260° C. or lower.

As shown in the Examples and Comparative Examples described hereinbelow, a particulate combustion catalyst including a carrier and a catalyst component whose amount is 0.5 to 10 mass %, as reduced to metallic Ag, on the basis of the mass of the carrier exhibits a sufficiently low Tig, whereas a particulate combustion catalyst including a carrier and a catalyst component whose amount is 1 to 9 mass %, as reduced to metallic Ag, on the basis of the mass of the carrier, and having a BET specific surface area of 11 to 20 $m^2/g$ exhibits a Tig of 260° C. or lower.

In consideration that the particulate filter of the present invention is produced by causing the particulate combustion catalyst of the present invention to be held on a base, preferably, the surface of the carrier is provided with a binder component such as $SiO_2$, $TiO_2$, $ZrO_2$, or $Al_2O_3$. When such a binder component is provided on the surface of the carrier, adhesion between the base and the carrier is enhanced, and the catalyst exhibits improved durability and heat resistance.

The particulate combustion catalyst of the present invention may be produced through, for example, the following process. The aforementioned monoclinic zirconium oxide particles are mixed with a binder component (e.g., $SiO_2$ or alumina sol) and water, and optionally, the resultant mixture is finely milled by means of a milling apparatus (e.g., a ball mill). The resultant dispersion is mixed with an aqueous solution of a water-soluble silver compound, and the mixture is thoroughly stirred, to thereby prepare a slurry. Thereafter, the slurry is dried, and the catalyst-component-supported monoclinic zirconium oxide particles are fired generally at 600 to 900° C., preferably at 730 to 870° C., more preferably at 750 to 850° C. for 10 hours or longer (generally, about 20 hours). When the firing temperature is lower than 600° C., the resultant catalyst tends to have large BET specific surface area and to exhibit high Tig, whereas when the firing temperature exceeds 900° C., the resultant catalyst tends to have small BET specific surface area and to exhibit high Tig (i.e., a practical product is less likely to be produced). When the firing temperature is 600 to 900° C., the resultant catalyst tends to have a BET specific surface area of about 8 to about 21 $m^2/g$ and to exhibit a Tig of 300° C. or lower, whereas when the firing temperature is 730 to 870° C., the resultant catalyst tends to have a BET specific surface area of about 11 to about 20 $m^2/g$ and to exhibit a Tig of 260° C. or lower. When the firing time is shorter than 10 hours, a catalyst having intended characteristics may fail to be produced, whereas even when the firing time exceeds 50 hours, effects commensurate with such a long firing time are not obtained.

The particulate filter of the present invention may assume any known form of particulate filter, but preferably has a three-dimensional structure. Specific examples of filters having a three-dimensional structure include a wall-through filter, a flow-through honeycomb filter, a wire mesh filter, a ceramic fiber filter, a metallic porous filter, a particle-charged filter, and a foam filter. Examples of the material of the base include ceramic materials such as cordierite and SiC; Fe—Cr—Al alloys; and stainless steel alloys.

The exhaust gas cleaning apparatus of the present invention, which includes therein the aforementioned particulate filter of the present invention, will be readily appreciated by those skilled in the art.

Next will be described a method for producing the particulate filter of the present invention. A base filter (e.g., a wire mesh filter) is coated with a slurry prepared as described above. The slurry-coated filter is fired generally at 600 to 900° C., preferably at 730 to 870° C., more preferably at 750 to 850° C. for 10 hours or longer (generally, about 20 hours). The total catalyst coating amount is preferably 10 to 100 g/L (for a wall-flow DPF) or about 50 to about 150 g/L (for a wire mesh DPF). When the total catalyst coating amount is excessively small, sufficient performance fails to be attained, whereas when the total catalyst coating amount is excessively large, back pressure to exhaust gas increases.

The present invention will next be described in detail with reference to Examples and Comparative Examples.

In the below-described Examples and Comparative Examples, the Tig (combustion initiation temperature) of a powdery catalyst was determined through the following method.

<Evaluation of Powdery Catalyst by Use of Simulated Exhaust Gas>

Particulate combustion catalyst powder (20 mg) and carbon (Printex-V (toner carbon), product of Degussa) (2 mg) were mixed for two minutes by means of an agate mortar, and the mixture was fixed at a center portion of a quartz reaction tube by use of quartz wool. While a circulation gas having the below-described composition was caused to flow through the quartz reaction tube at the below-described flow rate, the temperature of the reaction tube was elevated at the below-described temperature elevation rate by means of an electric furnace, and CO and $CO_2$ concentrations were measured at the outlet of the reaction tube by means of an infrared analyzer. The temperature as measured at the inlet of the catalyst-containing reaction tube when $CO_2$ concentration reached 30 ppm (i.e., electric furnace control temperature) was regarded as Tig (combustion initiation temperature).

Gas composition: $O_2$: 10%, $N_2$: 90%
Flow rate: 400 cc/min
Temperature elevation rate: 10 degrees (° C.)/min Examples 1 to 6 and Comparative Examples 1 to 9

Monoclinic zirconium oxide ($ZrO_2$) particles or γ-alumina ($Al_2O_3$) particles were employed as a carrier. The powdery carrier was mixed with aqueous silver nitrate solution or nitric acid solution of (dinitrodiamine) Pt so that the amount of a catalyst component supported (as reduced to metallic silver or metallic platinum) on the basis of the mass of the carrier was adjusted as shown in Table 1. The resultant mixture was stirred for one hour. Thereafter, water was evaporated under heating, followed by drying at 120° C. The thus-dried product was fired at 750° C. for 20 hours, to thereby produce a particulate combustion catalyst. Table 1 shows the BET specific surface area and Tig of the particulate combustion catalyst.

TABLE 1

| | Carrier | Catalyst component | Amount supported | BET specific surface area | Tig |
|---|---|---|---|---|---|
| Comparative Example 1 | $ZrO_2$ | Ag | 0 mass % | 25.6 m²/g | 384° C. |
| Example 1 | $ZrO_2$ | Ag | 0.5 mass % | 20.7 m²/g | 300° C. |
| Example 2 | $ZrO_2$ | Ag | 1 mass % | 19.2 m²/g | 251° C. |
| Example 3 | $ZrO_2$ | Ag | 2 mass % | 16.0 m²/g | 245° C. |
| Example 4 | $ZrO_2$ | Ag | 5 mass % | 15.3 m²/g | 256° C. |
| Example 5 | $ZrO_2$ | Ag | 9 mass % | 13.1 m²/g | 258° C. |
| Example 6 | $ZrO_2$ | Ag | 10 mass % | 10.2 m²/g | 264° C. |
| Comparative Example 2 | $Al_2O_3$ | Ag | 0 mass % | 147.8 m²/g | 479° C. |
| Comparative Example 3 | $Al_2O_3$ | Ag | 1 mass % | 146.9 m²/g | 487° C. |
| Comparative Example 4 | $Al_2O_3$ | Ag | 2 mass % | 146.4 m²/g | 476° C. |
| Comparative Example 5 | $Al_2O_3$ | Ag | 5 mass % | 136.8 m²/g | 441° C. |
| Comparative Example 6 | $Al_2O_3$ | Pt | 0 mass % | 147.8 m²/g | 479° C. |
| Comparative Example 7 | $Al_2O_3$ | Pt | 1 mass % | 142.8 m²/g | 458° C. |
| Comparative Example 8 | $Al_2O_3$ | Pt | 2 mass % | 151.2 m²/g | 459° C. |
| Comparative Example 9 | $Al_2O_3$ | Pt | 5 mass % | 147.8 m²/g | 461° C. |

As is clear from data shown in Table 1 (Examples 1 to 6), when Ag (i.e., a catalyst component) was supported on a carrier formed of monoclinic zirconium oxide particles so that the amount of the catalyst component was adjusted to 0.5 to 10 mass % (as reduced to metallic Ag) on the basis of the mass of the carrier, the resultant catalyst exhibited a Tig of 300° C. or lower and had a BET specific surface area of 8 to 21 m²/g, and when the catalyst component was supported on the carrier so that the amount of the catalyst component was adjusted to 1 to 9 mass % (as reduced to metallic Ag) on the basis of the mass of the carrier, the resultant catalyst exhibited a Tig of 260° C. or lower and had a BET specific surface area of 11 to 20 m²/g. In contrast, as is clear from data obtained in Comparative Examples 2 to 9, when $Al_2O_3$ was employed as a carrier in place of $ZrO_2$, or when Pt was employed as a catalyst component in place of Ag, the Tig of the resultant catalyst was not low.

Examples 7 to 11 and Comparative Example 10

Monoclinic zirconium oxide ($ZrO_2$) particles were employed as a carrier. The powdery carrier was mixed with an aqueous silver nitrate solution so that the amount of a catalyst component supported (as reduced to metallic silver) on the basis of the mass of the carrier was adjusted as shown in Table 2. The resultant mixture was stirred for one hour. Thereafter, water was evaporated under heating, followed by drying at 120° C. The thus-dried product was fired at 750° C. for 20 hours, to thereby produce a particulate combustion catalyst. Table 2 shows the BET specific surface area and Tig of the particulate combustion catalyst.

TABLE 2

| | Carrier | Catalyst component | Amount supported | BET specific surface area | Tig |
|---|---|---|---|---|---|
| Comparative Example 10 | $ZrO_2$ | Ag | 0 mass % | 10.0 m²/g | 396° C. |
| Example 7 | $ZrO_2$ | Ag | 0.5 mass % | 9.5 m²/g | 300° C. |
| Example 8 | $ZrO_2$ | Ag | 1 mass % | 8.5 m²/g | 268° C. |
| Example 9 | $ZrO_2$ | Ag | 2 mass % | 8.4 m²/g | 269° C. |
| Example 10 | $ZrO_2$ | Ag | 5 mass % | 8.4 m²/g | 274° C. |
| Example 11 | $ZrO_2$ | Ag | 10 mass % | 8.3 m²/g | 269° C. |

Examples 12 to 18

Monoclinic zirconium oxide particles were employed as a carrier. The powdery carrier was mixed with an aqueous silver nitrate solution so that the amount of a catalyst component supported (as reduced to metallic silver) was adjusted to 1 mass % on the basis of the mass of the carrier, and the resultant mixture was stirred for one hour. Thereafter, water was evaporated under heating, followed by drying at 120° C. The thus-dried product was fired at a temperature shown in Table 3 for 20 hours, to thereby produce a particulate combustion catalyst. Table 3 shows the BET specific surface area and Tig of the particulate combustion catalyst.

TABLE 3

| | Firing temperature | BET specific surface area | Tig |
|---|---|---|---|
| Example 12 | 600° C. | 27.5 m²/g | 277° C. |
| Example 13 | 650° C. | 23.2 m²/g | 268° C. |
| Example 14 | 700° C. | 21.1 m²/g | 271° C. |
| Example 15 | 750° C. | 19.2 m²/g | 251° C. |
| Example 16 | 800° C. | 13.9 m²/g | 259° C. |
| Example 17 | 850° C. | 11.9 m²/g | 252° C. |
| Example 18 | 900° C. | 6.2 m²/g | 275° C. |

Examples 19 to 24

Monoclinic zirconium oxide particles were employed as a carrier. The powdery carrier was mixed with an aqueous silver nitrate solution so that the amount of a catalyst component supported (as reduced to metallic silver) was adjusted to 1 mass % on the basis of the mass of the carrier, and the resultant mixture was stirred for one hour. Thereafter, water was evaporated under heating, followed by drying at 120° C. The thus-dried product was fired at 750° C. for a period of time shown in Table 4, to thereby produce a particulate combustion catalyst. Table 4 shows the BET specific surface area and Tig of the particulate combustion catalyst.

TABLE 4

|  | Firing time | BET specific surface area | Tig |
| --- | --- | --- | --- |
| Example 19 | 10 hours | 19.1 m$^2$/g | 259° C. |
| Example 20 | 15 hours | 18.0 m$^2$/g | 256° C. |
| Example 21 | 20 hours | 19.2 m$^2$/g | 251° C. |
| Example 22 | 25 hours | 15.1 m$^2$/g | 254° C. |
| Example 23 | 30 hours | 14.7 m$^2$/g | 255° C. |
| Example 24 | 50 hours | 12.9 m$^2$/g | 258° C. |

The invention claimed is:

1. A method for combusting an exhaust gas discharged from diesel, the method comprising:
    employing a particulate combustion catalyst comprising a carrier formed of monoclinic zirconium oxide particles, and a catalyst component and is supported on the carrier, wherein the catalyst component consists of metallic Ag or Ag oxide, and the amount of the catalyst component is 0.5 to 10 mass %, as reduced to metallic Ag, on the basis of the mass of the carrier, and
    removing soot being contained in the exhaust gas discharged from diesel through oxidation.

2. The method for combusting an exhaust gas discharged from diesel according to claim 1, wherein the particulate combustion catalyst is produced through firing at 600 to 900° C. for 10 hours or longer.

3. The method for combusting an exhaust gas discharged from diesel according to claim 1, wherein the catalyst particulate combustion has a BET specific surface area of 8 to 21 m$^2$/g.

4. The method for combusting an exhaust gas discharged from diesel according to claim 1, wherein the particulate combustion catalyst exhibits a combustion initiation temperature (Tig) of 300° C. or lower.

5. A method for combusting an exhaust gas discharged from diesel, the method comprising:
    employing catalyst comprising a carrier formed of monoclinic zirconium oxide particles, and a catalyst component and is supported on the carrier, wherein the catalyst component consists of metallic Ag or Ag oxide, and wherein the amount of the catalyst component is 1 to 9 mass %, as reduced to metallic Ag, on the basis of the mass of the carrier, and the catalyst has a BET specific surface area of 11 to 20 m$^2$/g; and
    removing soot being contained in the exhaust gas discharged from diesel through oxidation.

6. The method for combusting an exhaust gas discharged from diesel according to claim 5,
    wherein the catalyst exhibits a combustion initiation temperature (Tig) of 260° C. or lower.

7. The method for combusting an exhaust gas discharged from diesel according to claim 5,
    wherein the catalyst is produced through firing at 730 to 870° C. for 10 hours or longer.

8. A method for combusting an exhaust gas discharged from diesel, the method comprising:
    employing a particulate filter comprising a base coated with a particulate combustion catalyst; and
    removing soot being contained in the exhaust gas discharged from diesel through oxidation,
    wherein the particulate combustion catalyst comprising a carrier formed of monoclinic zirconium oxide particles, and a catalyst component and is supported on the carrier, wherein the catalyst component consists of metallic Ag or Ag oxide, and the amount of the catalyst component is 0.5 to 10 mass %, as reduced to metallic Ag, on the basis of the mass of the carrier.

9. A method for combusting an exhaust gas discharged from diesel, the method comprising:
    employing a particulate filter comprising a base coated with a particulate combustion catalyst; and
    removing soot being contained in the exhaust gas discharged from diesel through oxidation,
    wherein the particulate combustion catalyst comprising a carrier formed of monoclinic zirconium oxide particles, and a catalyst component and is supported on the carrier, wherein the catalyst component consists of metallic Ag or Ag oxide, and the amount of the catalyst component is 1 to 9 mass %, as reduced to metallic Ag, on the basis of the mass of the carrier, and the catalyst has a BET specific surface area of 11 to 20 m$^2$/g.

10. A method for combusting an exhaust gas discharged from diesel, the method comprising:
    employing an exhaust gas cleaning apparatus comprising a particulate filter coated with a particulate combustion catalyst; and
    removing soot being contained in the exhaust gas discharged from diesel through oxidation,
    wherein the particulate combustion catalyst comprising a carrier formed of monoclinic zirconium oxide particles, and a catalyst component and is supported on the carrier, wherein the catalyst component consists of metallic Ag or Ag oxide, and the amount of the catalyst component is 0.5 to 10 mass %, as reduced to metallic Ag, on the basis of the mass of the carrier.

11. A method for combusting an exhaust gas discharged from diesel, the method comprising:
    employing an exhaust gas cleaning apparatus comprising a particulate filter coated with a particulate combustion catalyst; and
    removing soot being contained in the exhaust gas discharged from diesel through oxidation,
    wherein the particulate combustion catalyst comprising a carrier formed of monoclinic zirconium oxide particles, and a catalyst component and is supported on the carrier, wherein the catalyst component consists of metallic Ag or Ag oxide, and the amount of the catalyst component is 1 to 9 mass %, as reduced to metallic Ag, on the basis of the mass of the carrier, and the catalyst has a BET specific surface area of 11 to 20 m$^2$/g.

* * * * *